US010999317B2

(12) United States Patent
Kozloski et al.

(10) Patent No.: US 10,999,317 B2
(45) Date of Patent: May 4, 2021

(54) BLOCKCHAIN TRACKING OF VIRTUAL UNIVERSE TRAVERSAL RESULTS

(71) Applicant: International Business Machines Corporation, Armonk, NY (US)

(72) Inventors: James R. Kozloski, New Fairfield, CT (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/544,126

(22) Filed: Aug. 19, 2019

(65) Prior Publication Data

US 2019/0373015 A1    Dec. 5, 2019

Related U.S. Application Data

(63) Continuation of application No. 15/859,436, filed on Dec. 30, 2017, now Pat. No. 10,389,749, which is a (Continued)

(51) Int. Cl.
*H04L 29/06*    (2006.01)
*A63F 13/79*    (2014.01)
(Continued)

(52) U.S. Cl.
CPC .......... *H04L 63/1441* (2013.01); *A63F 13/32* (2014.09); *A63F 13/33* (2014.09);
(Continued)

(58) Field of Classification Search
CPC . H04L 63/12; H04L 63/1441; H04L 63/1416; H04L 63/08; H04L 63/14;
(Continued)

(56) References Cited

U.S. PATENT DOCUMENTS 6,108,670 A    8/2000   Weida et al.
7,139,984 B2   11/2006  Beaumont et al.
(Continued)

OTHER PUBLICATIONS

Peter Mell et al., "The NIST Definition of Cloud Computing"_ NIST Special Publication 800-145. Sep. 2011, pp. 1-7.
(Continued)

*Primary Examiner* — Kristine L Kincaid
*Assistant Examiner* — Shaqueal D Wade
(74) *Attorney, Agent, or Firm* — Anthony Curro; Otterstedt, Wallace & Kammer, LLP

(57) ABSTRACT

An exemplary computer-implemented method includes obtaining at least one teleportation invite block that records a virtual universe teleportation invite marked by at least one parameter. The teleportation invite identifies a virtual universe user as an invitee. Responsive to the parameter, assess whether the virtual universe teleportation invite is potentially malicious, and alert the invitee in case the virtual universe teleportation invite is potentially malicious. Another exemplary computer-implemented method includes obtaining at least one complaint block that records a complaint made against a virtual universe user; obtaining a plurality of traversal blocks that record virtual universe traversal events by the virtual universe user; identifying a pattern of harassment by analyzing a first plurality of traversal blocks that precede the complaint block; identifying a risk of future harassment by analyzing a second plurality of traversal blocks that follow the complaint block; and issuing an alert regarding the risk of future harassment.

20 Claims, 8 Drawing Sheets

Related U.S. Application Data continuation of application No. 15/581,084, filed on Apr. 28, 2017, now Pat. No. 10,601,861.

(51) Int. Cl.

| | | |
|---|---|---|
| *A63F 13/73* | (2014.01) | |
| *A63F 13/75* | (2014.01) | |
| *A63F 13/35* | (2014.01) | |
| *A63F 13/32* | (2014.01) | |
| *A63F 13/33* | (2014.01) | |
| *A63F 13/352* | (2014.01) | |
| *A63F 13/792* | (2014.01) | |

(52) U.S. Cl.
CPC ............ *A63F 13/35* (2014.09); *A63F 13/352* (2014.09); *A63F 13/73* (2014.09); *A63F 13/75* (2014.09); *A63F 13/79* (2014.09); *A63F 13/792* (2014.09); *H04L 63/1408* (2013.01); *H04L 2463/146* (2013.01)

(58) Field of Classification Search
CPC .. H04L 63/1425; H04L 63/1483; A63F 13/32; A63F 13/33; A63F 13/35; A63F 13/73; A63F 13/75; A63F 13/79; A63F 13/352
See application file for complete search history.

(56) References Cited

U.S. PATENT DOCUMENTS

| | | |
|---|---|---|
| 8,271,475 B2 | 9/2012 | Hamilton, II et al. |
| 8,271,491 B2 | 9/2012 | Lizuka |
| 8,312,223 B2 | 11/2012 | Bolger et al. |
| 8,424,075 B1 | 4/2013 | Walsh et al. |
| 8,595,632 B2 | 11/2013 | Hamilton, II et al. |
| 10,389,749 B2 | 8/2019 | Kozloski et al. |
| 2009/0089684 A1 | 4/2009 | Boss et al. |
| 2009/0113040 A1 | 4/2009 | Zalewski |
| 2010/0082798 A1* | 4/2010 | Bhogal ................... A63F 13/69 709/224 |
| 2011/0010325 A1 | 1/2011 | Brillhart et al. |
| 2011/0055136 A1 | 3/2011 | Hamilton, II et al. |
| 2011/0055728 A1 | 3/2011 | Dawson et al. |
| 2012/0137367 A1* | 5/2012 | Dupont ................... G06F 21/00 726/25 |
| 2014/0208037 A1* | 7/2014 | Corrao ................... G06F 12/122 711/136 |
| 2014/0379752 A1 | 12/2014 | Dawson et al. |
| 2018/0114403 A1* | 4/2018 | Jayachandran ....... H04L 9/3236 |
| 2018/0198617 A1 | 7/2018 | Drouin et al. |
| 2018/0316716 A1 | 11/2018 | Kozloski et al. |

OTHER PUBLICATIONS

John E. Kelly III, "Computing, cognition, and the future of knowing", IBM Corp. Oct. 2015, pp. 1-11.

Olga Kharif, "Built for Bitcoin, Blockchain Goes Beyond Crypto-Currency", Bloomberg News. May 19, 2015, pp. 2-6.

BigchainDB GmbH, "ascribe FAQ", Mar. 17, 2017, pp. 1-16.

Outlier Ventures Research, "Blockchain-Enabled Convergence", Mar. 17, 2017, pp. 1-40 plus cover.

Wikipedia, "Griefer". Mar. 1, 2017, downloaded from https://en.wikipedia.org/wiki/Griefer, pp. 1-5.

hyperledger, "The Fabric Model". Mar. 6, 2017, pp. 1-3.

Chris Campbell, "Virtual Reality and Blockchain = Freedom!" Laissez Faire Today. May 9, 2016, pp. 1-11.

Second Life Wiki, "Teleport". Linden Labs, Inc. Jan. 20, 2014, pp. 1-2.

Simon de la Rouviere, The Blockchain'S Ultimate Frontier: Virtual Reality, excerpt from http://simondlr.com/post/99248898933/the-blockchains-ultimate-frontier-virtual, pp. 1-3, available at least as early as Dec. 21,2016.

Paul J. Otterstedt, List of IBM Patents or Patent Applications Treated As Related, Sep. 12, 2019, pp. 1-2.

* cited by examiner

BLOCKCHAIN TRACKING OF VIRTUAL
UNIVERSE TRAVERSAL RESULTS

CROSS-REFERENCE TO RELATED
APPLICATIONS

This application is a continuation of U.S. patent application Ser. No. 15/859,436 filed 30 Dec. 2017, which is in turn a continuation of U.S. patent application Ser. No. 15/581,084 filed Apr. 28, 2017, the complete disclosures of both which are expressly incorporated herein by reference in their entireties for all purposes.

BACKGROUND

The present invention relates to the electrical, electronic and computer arts, and more specifically, to virtual universes.

A VU (virtual universe) is a computer-implemented simulation intended for its users to traverse, inhabit, and interact through the use of avatars. Many VUs are represented using 3-D graphics and landscapes, and are populated by many thousands of users, known as "residents." VUs (virtual universes) are traversed by such methods as walking, flying, and teleporting. A teleport provides a mechanism to travel rapidly from one location in a VU to another location, even if the locations are geographically far apart. In typical virtual universes, an invitation for teleporting may be received that is an offer to transport the recipient from a recipient's current location to a second location. A user may reject or accept the offer for teleporting. If the user accepts the offer, for example by selecting the invitation presented as words on the VU GUI, the user's avatar is then transported from the current location to the second location. In practical terms, teleportation refers to the "re-rendering" of an avatar in a different environment. This re-rendering may occur on the same processor within the same simulation engine; it may occur on a different processor within the same simulation engine; on the same processor with a different simulation engine; or a different processor with a different simulation engine.

SUMMARY

In view of the present disclosure, it will be understood that principles of the invention provide techniques for blockchain tracking of virtual universe traversal results. In one aspect, an exemplary computer-implemented method includes obtaining at least one teleportation invite block that records a virtual universe teleportation invite marked by at least one parameter, where the teleportation invite identifies a virtual universe user as an invitee. The exemplary method also includes assessing, responsive to the parameter, whether the virtual universe teleportation invite is potentially malicious, and alerting the invitee in case the virtual universe teleportation invite is potentially malicious.

In another aspect, an exemplary computer-implemented method includes obtaining at least one complaint block that records a complaint made against a virtual universe user; obtaining a plurality of traversal blocks that record virtual universe traversal events by the virtual universe user; identifying a pattern of harassment by analyzing a first plurality of traversal blocks that precede the complaint block; identifying a risk of future harassment by analyzing a second plurality of traversal blocks that follow the complaint block; and issuing an alert regarding the risk of future harassment.

Certain embodiments of the invention provide an apparatus that includes a memory encoded with computer-executable instructions and a processor operatively coupled in communication with the memory. The processor is configured by the computer-executable instructions to facilitate any of the methods above discussed.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

Figure 1:
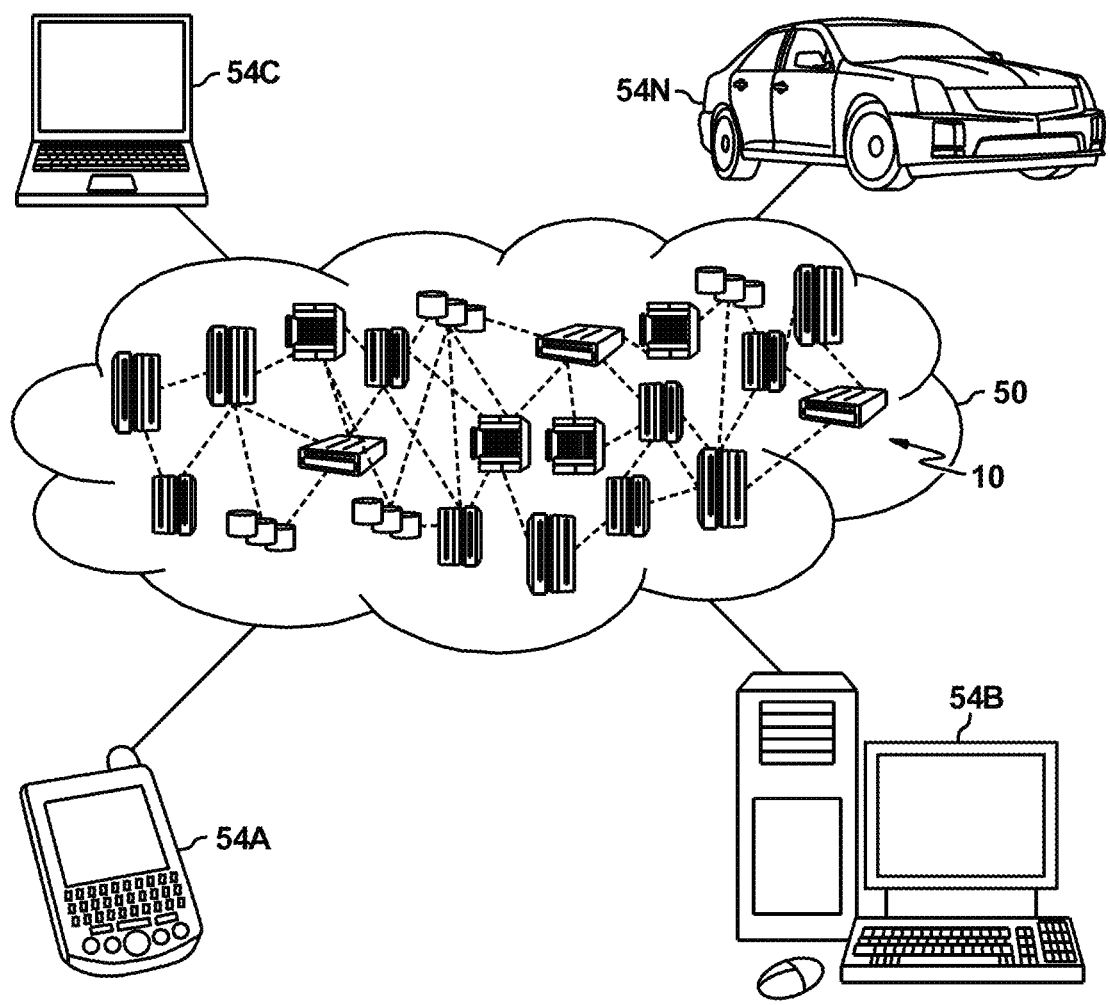
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
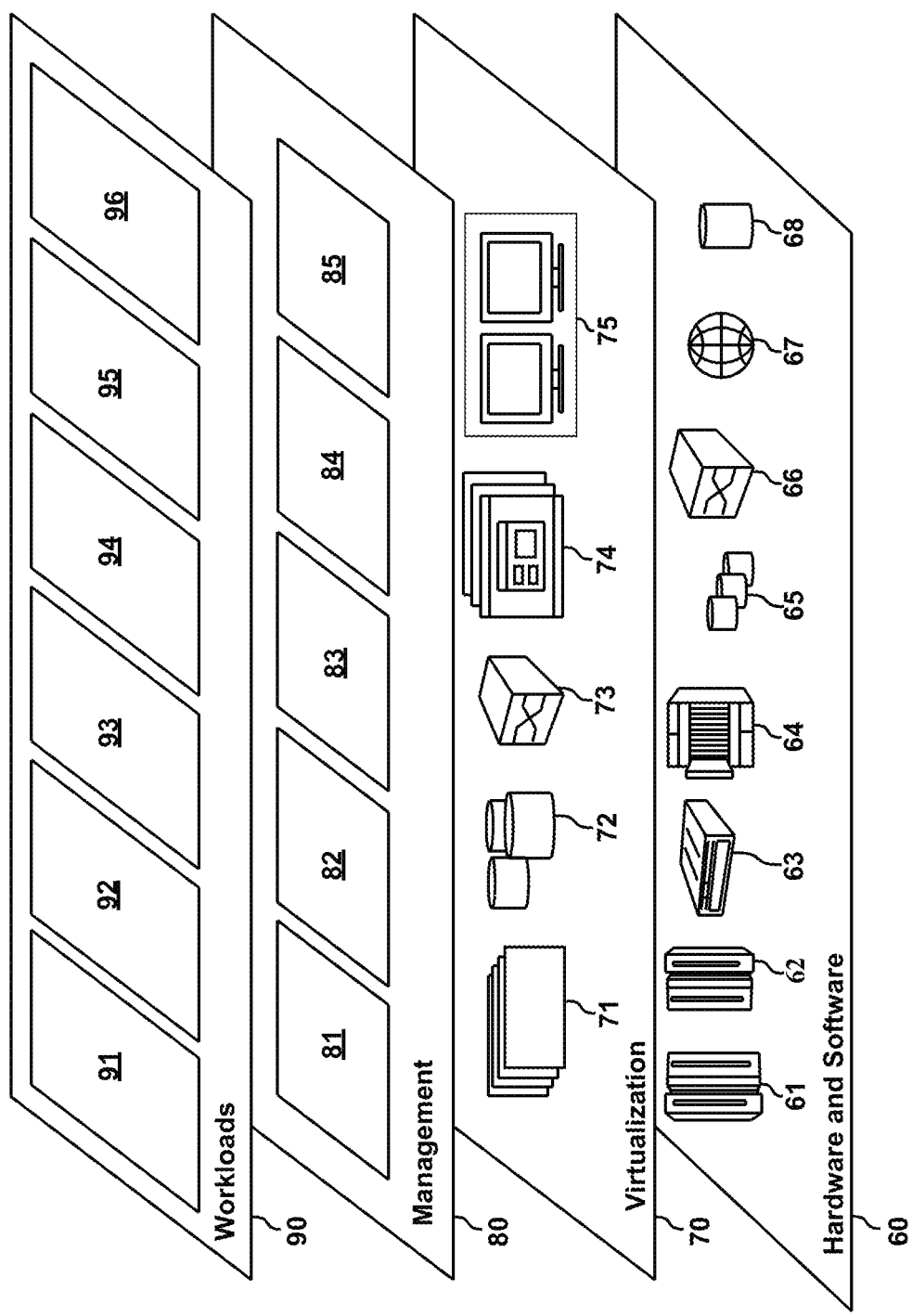
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a virtual universe traversal result tracking module 96.

Embodiments of the invention are applicable to a virtual universe ("VU"). A VU is typically a busy place with many thousands of users and friends logged on at any moment. If a single user is sent numerous teleport invitations, the user may not want to interrupt the user's current activity or work in order to accept the invitations. Multiple teleport invitation popup windows can clutter a user's screen distracting from the current activity. Users may also wish to consider teleport invitations when a more appropriate time is available, giving the user the option to accept, reject, or save the invitation. Once users have received multiple teleport invitations, there is presently no way to prioritize or administer the invitations. Prioritization of teleport invitations is especially important in areas related to business applications where teleport invitations represent system event notifications that require immediate attention. Teleport invitations may be selectable from a queue so the user can accept the invitation, reject it, save it, or forward it to a friend or group. Users may also desire the ability to setup default priorities responsive to the invitation senders, and invitation type. In some embodiments, automatic rules and agents may reduce the need for users to take active steps to sets priorities.

Advantageously, certain embodiments of the invention provide a record of such teleportation transactions. For example, such a record may make it easier to track mischief-makers, users who inappropriately obtain items from other users' avatars, and related VU users. Such a record may also be useful in a court case to establish a trail that may precede a financial or even social transaction, or to help a user of an avatar to confirm his or her identity. It may be useful for a gamer to validate various aspects of game play, question, traversals through a world, etc. It may be useful to investigate patterns of harassment. It also may be useful when investigating the provenance of an avatar or an expensive virtual item.

Advantageously, certain embodiments of the invention more specifically provide a record of the results of teleportation transactions, regarding the ability of virtual universe users to traverse the virtual universe after acceptance of teleportation invites to a given location. This may be useful in mitigating a particular type of harassment or "griefing" in which a "griefer" sends virtual universe users malicious teleportation invites that target an inescapable destination. Naïve acceptance of such an invite can essentially permanently terminate a user's virtual universe experience (absent some form of administrator intervention to reset the user's location; not all virtual universes provide for or permit such intervention).

Advantageously, certain embodiments of the invention enable the virtual universe to alert users to potentially malicious teleportation invites, responsive to the traversal results of users who previously have accepted invites that (a) target the same destination or (b) are issued by the same host.

Advantageously, certain embodiments of the invention enable the virtual universe to maintain a record of the results (complaints) produced by virtual universe traversal events by a given virtual universe user. Such a record can be analyzed to identify particular patterns of virtual universe traversal events that produce complaints from other users. For example if a given user has been identified by another user as a "griefer" or "stalker", the system can analyze the given user's record of traversal events in a rule-based manner to identify traversal events, involving the other user, that constitute a pattern of harassment preceding the complaint. Further, the system then can match the pattern of harassment to more recent traversal events by the given user in order to identify a risk of harassment. The system then can alert the given user, or another user, regarding the risk of harassment.

A "griefer" denotes a VU user who deliberately irritates and harasses other users within the VU, using aspects of the VU in unintended ways. A griefer derives pleasure primarily or exclusively from the act of annoying other users, and as such is a particular nuisance in online gaming communities, since griefers often cannot be deterred by penalties related to in-game goals. Griefers may partake in massively multi-player online role-playing games (MMORPG). Related negative behaviors include inappropriate language, cheating, excessive volume of communications, blocking a player, stealing, unreasonable "killing" of other users' avatars, threatening, making unwelcome advances, and using in-game bugs (exploits) for trapping teammates in inescapable locations by physics props, special abilities, or teleportation into inescapable locations.

A blockchain is a distributed permissionless or permissioned ledger that maintains a continuously growing list of data records hardened against tampering and revision. It consists of data structure blocks—which hold exclusively data in initial blockchain implementations, and both data and programs in some of the more recent implementations—with each block holding batches of individual transactions and the results of any blockchain executables ("chaincode"). Each block contains a timestamp and information (e.g., a hash of a previous block) that links it to a previous block. Thus, a blockchain can serve as a public or proprietary network ledger of transactions committed by the users associated with the blockchain. Blockchain is peer-to-peer. Additionally, the blockchain resides not in a single server, but across a distributed network of computers. Accordingly, whenever new transactions occur, the peers of the distributed network authenticate the additions to the blockchain. Permissionless blockchain implementations allow any user to connect to the network, send new transactions to it, verify transactions, and create new blocks. In permissioned blockchain, only authorized users may sign and verify transactions. According to some implementations of permissioned blockchain, users initially can be authorized by hard-coded chaincode; thereafter the chaincode can be modified to authorize new users by consent of the existing authorized users.

Distributed recording and authentication provide substantial beneficial technical effects of blockchain technology: (1) The ability for independent nodes to converge on a consensus of the latest version of a large data set such as a ledger, even when the nodes are run anonymously, have poor interconnectivity and have operators who are dishonest or malicious. (2) The ability for any well-connected node to determine, with reasonable certainty, whether a transaction does or does not exist in the data set. (3) The ability for any node that creates a transaction to, after a confirmation period, determine with a reasonable level of certainty whether the transaction is valid, able to take place and become final (i.e., that no conflicting transactions were confirmed into the blockchain elsewhere that would invalidate the transaction, such as the same currency units "double-spent" somewhere else). (4) A prohibitively high cost to attempt to rewrite or alter transaction history. (5) Automated conflict resolution that ensures that conflicting transactions (such as two or more attempts to spend the same balance in different places) never become part of the confirmed data set.

Accordingly, embodiments of the invention utilize blockchain technology to securely track and maintain a record of traversal events in a virtual universe (VU) or 3D game. VU traversal transactions associated with a stakeholder are compiled into a chain of traversal transaction blocks. The chain can be considered a chronicle of the user's traversal path throughout the user's game life. When a transaction is conducted, any corresponding parameters (e.g., including source location, destination, time, traversal mechanism) are validated by blockchain users running validation modules. The validation modules compare the transaction to pre-defined VU rules, and generate a new block in case the rules are satisfied. In some implementations, the VU rules may be recorded in chaincode. Once the new block has been generated, it can be appended to the user's traversal blockchain.

A traversal blockchain block records the data relevant to a transaction (traversal event): the send id, receiver id, an item or avatar token (the fingerprint of the item or avatar using which historical details of the item or avatar can be retrieved), metadata information (e.g. timestamp, location, path taken, etc.), distance traveled, VU or 3D context/ environment information, etc. In this context, a transaction includes the traversal of an avatar or item in the VU or 3D. According to select embodiments of the invention, traversal includes walking, running, vehicular access, flying, or teleportation. The genesis block of the teleportation blockchain may store the hash values of all the possible ways to teleport. It may contain a hash of the World Map, landmark information, and destination guide. The update of ways of teleportation also triggers an update transaction to embodiments of the inventive blockchain system. The validating devices that run the chaincode to validate an update transaction may encode various customized algorithms including graph analysis, graph searching, landmark identification and detection, etc.

One or more embodiments of the invention also include blockchain reverse correlation ("BCRC") based on human behaviors, and contextual data recorded in the traversal blockchain block records relevant to a transaction (traversal event). The Specifically, a user may traverse a virtual universe in specific patterns associated with user subsequent behavior. Sometimes, a user may not even be aware that depending on this traversal pattern, the user's behavior may or may not have a higher likelihood of resulting in bad behavior as perceived by recipients of the user's actions. A BCRC is a statistical measure of events preceding a virtual universe traversal event. BCRC is optimal for detecting and alerting a user, or controlling access of the user to specific locations, in response to obtaining a probability that the user's past or current traversal pattern is likely to result in griefer behavior. BCRC makes use of a griefer behavior complaint against a given user by another user of the VU to trigger the accessing of the blockchain in order to perform statistics on the blocks that precede the complaint by some number of steps and/or a specified amount of time. After the statistical learning component achieves a confidence level (C) that a predictive pattern has been learned, certain embodiments of the system initiate ongoing analysis of the given user's traversal blockchain to support human alerting and intervention responsive to the blockchain statistics.

Another implementation of BCRC involves a rating analysis of a teleportation destination and/or a rating analysis of teleportation invites by a given user (griefer analysis), along with a triggering alert system for identifying, to an invited user, a potentially malicious teleportation invite.

Figure 3:
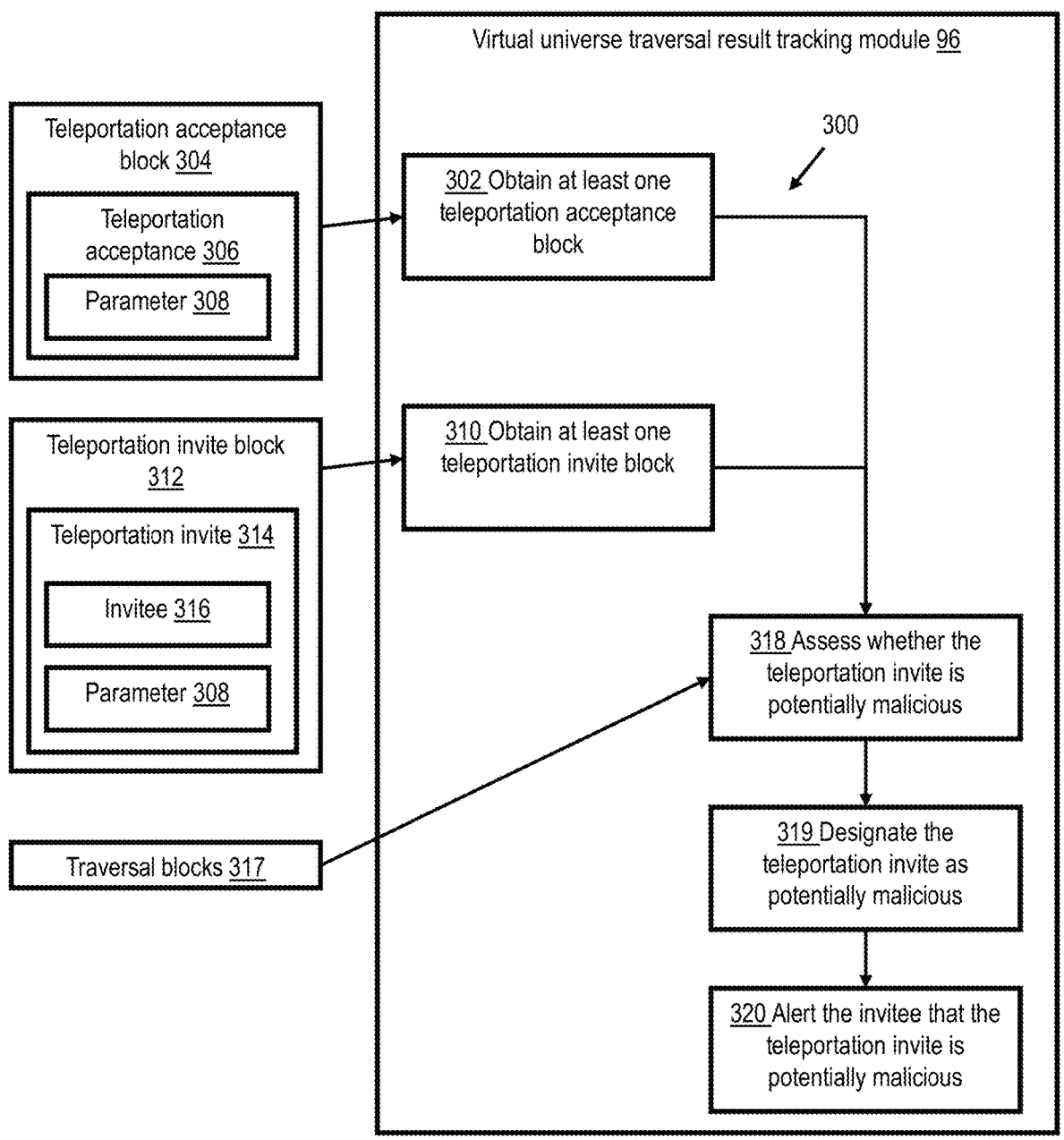
FIG. 3 depicts in flowchart form a method for virtual universe traversal result tracking, according to embodiments of the invention.

Accordingly, referring to FIG. 3, the virtual universe traversal result tracking module 96 implements a method 300 for virtual universe traversal result tracking. The method 300 includes obtaining 302 at least one teleportation acceptance block 304 of a blockchain that records VU traversal transactions. The teleportation acceptance block 304 records a virtual universe teleportation acceptance 306 that is marked by at least one parameter 308. According to certain implementations, the at least one parameter 308 identifies a virtual universe location as the destination of the teleportation acceptance. According to other implementations, the at least one parameter 308 identifies a virtual universe user as the host that issued a teleportation invite underlying the teleportation acceptance. Some implementations include both the destination and the host as parameters for marking the teleportation acceptance.

The method 300 also includes obtaining 310 at least one teleportation invite block 312 that records a virtual universe teleportation invite 314 also marked by the parameter 308. Notably, the teleportation acceptance block may be obtained before or after obtaining the teleportation invite block; a parameter of the teleportation invite may be used to obtain the teleportation acceptance block, or a parameter of the teleportation acceptance may be used to obtain the teleportation invite block.

Figure 4:
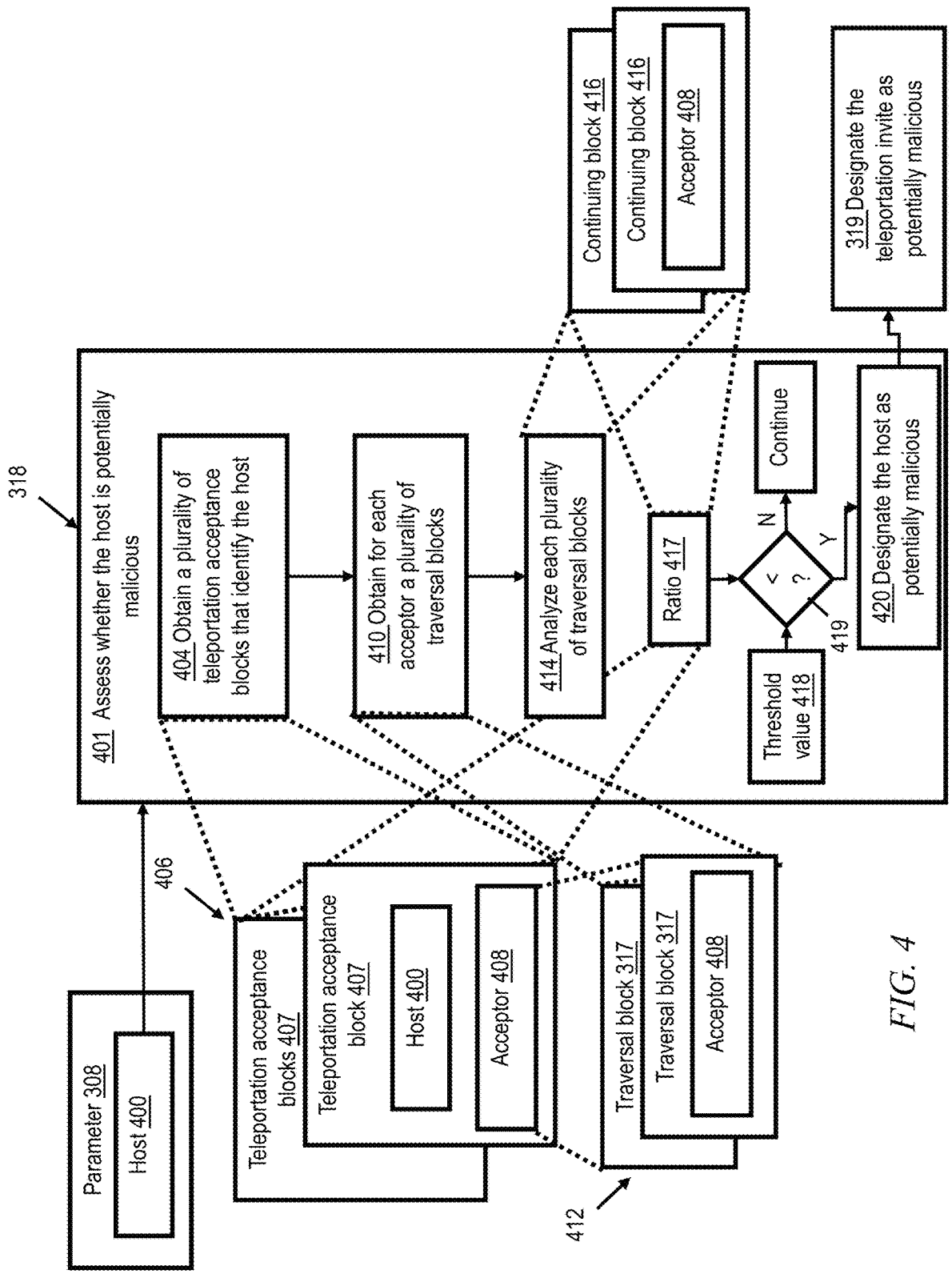
FIG. 4 illustrates in flowchart form a method for identifying a teleportation invite as potentially malicious, according to embodiments of the invention.
Figure 5:
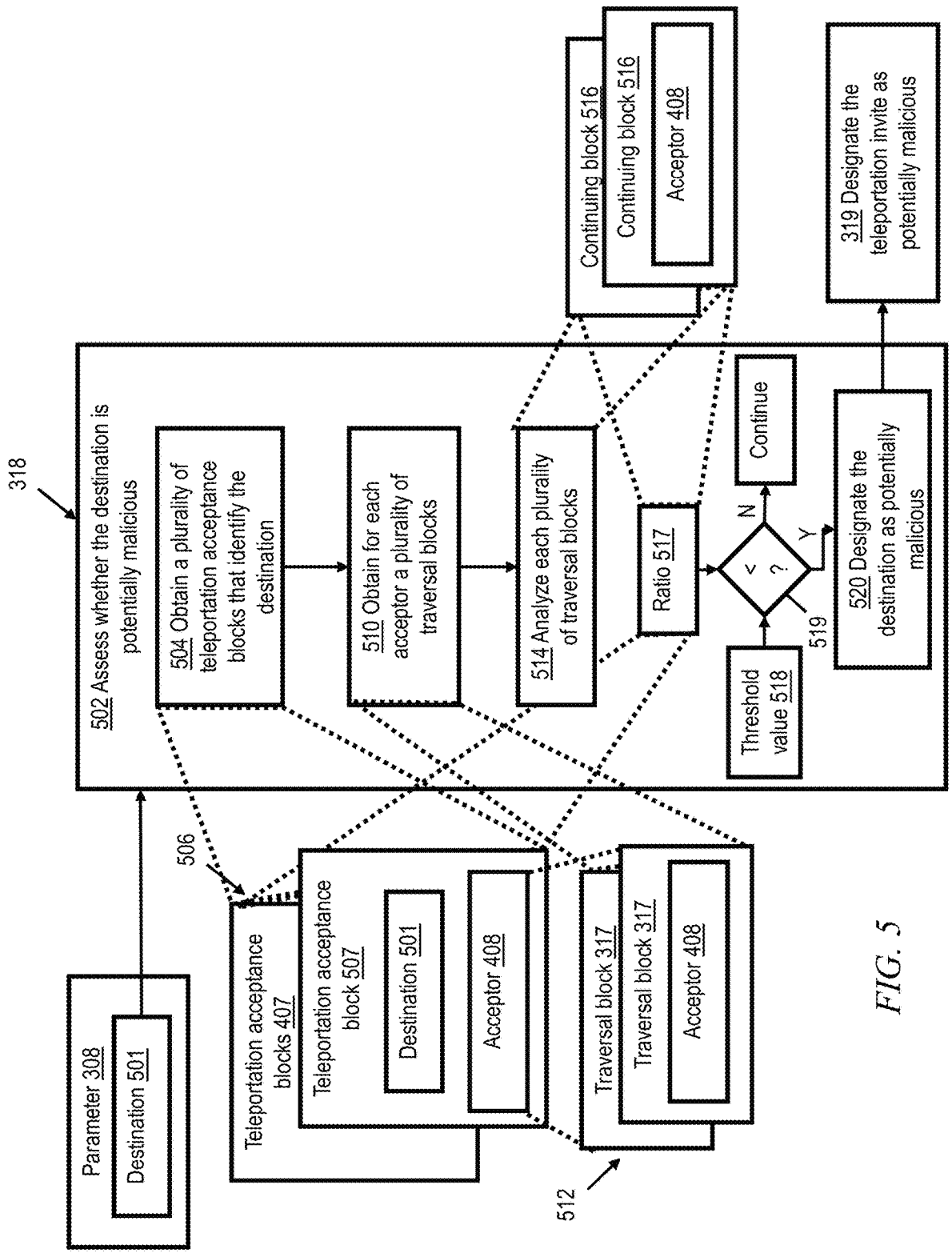
FIG. 5 depicts in flowchart form another method for identifying a teleportation invite as potentially malicious, according to embodiments of the invention.
Figure 6:
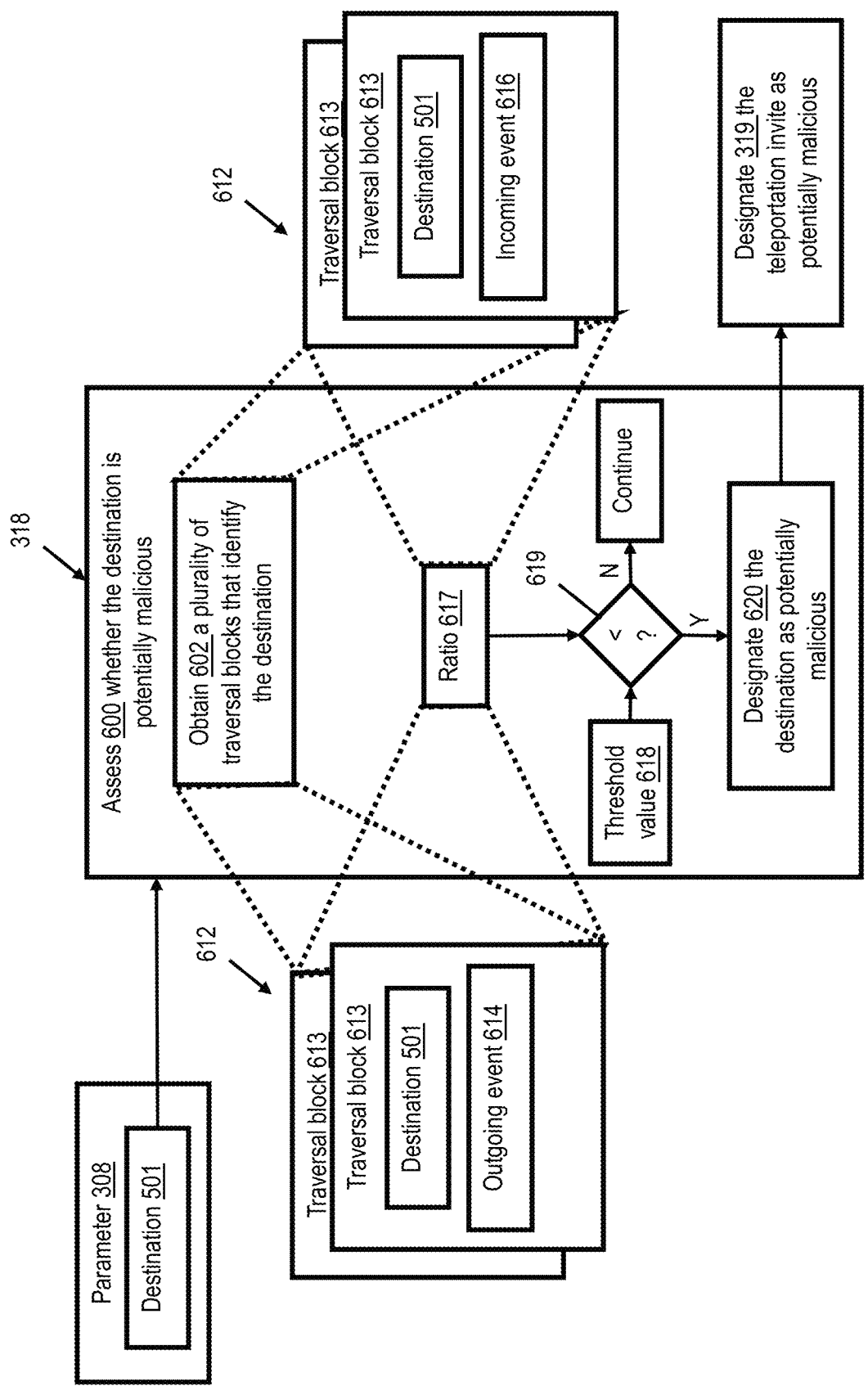
FIG. 6 illustrates in flowchart form another method for identifying a teleportation invite as potentially malicious, according to embodiments of the invention.

Generally, the teleportation invite 314 identifies a virtual universe user as an invitee 316. Responsive to traversal blocks 317 that follow the teleportation acceptance block 304, the virtual universe traversal result tracking module 96 assesses 318 whether the virtual universe teleportation invite 314 is potentially malicious. FIGS. 4-6 depict different modes for assessing whether the virtual universe teleportation invite 314 is potentially malicious.

In case the virtual universe traversal result tracking module 96 designates 319 the virtual universe teleportation invite as potentially malicious, then the method 300 proceeds to alert 320 the invitee 316.

Referring to FIG. 4, a protocol for assessing 318 whether the virtual universe teleportation invite 314 is potentially malicious relates to the parameter 308 that identifies a virtual universe user as a host 400 of the invite 314. In this case the assessment 318 includes assessing 401 whether the host 400 is potentially malicious. First, obtain, at step 404, a plurality 406 of teleportation acceptance blocks 407 that identify the host 400; each of the teleportation acceptance blocks defines a virtual universe user as an acceptor 408. Also obtain for each acceptor 408, at step 410, a plurality 412 of traversal blocks 317 that record virtual universe traversal events by the acceptor 408. Then analyze, at step 414, each plurality 412 of traversal blocks 317 in an effort to identify "continuing" virtual universe traversal blocks 416 that follow each acceptor's teleportation acceptance block. In decision block 419, compare a ratio 417 of continuing virtual universe traversal blocks 416 to teleportation acceptance blocks 407 with a threshold value 418. Given the teachings herein, the skilled artisan will be able to pick suitable threshold values. In a non-limiting example, a suitable threshold value might be in the range of 0.9 to 1.0, with a number smaller than 1.0 being used to account for virtual universe users who have accepted a teleportation invitation but who have not yet chosen to traverse from the teleportation destination. In case (Y branch of decision block 419) the ratio 417 is less than the threshold value 418, at step 420 designate the host 400 as potentially malicious. Otherwise, (N branch of decision block 419) simply wait for the next assessment that is required, as indicated by the un-numbered "continue" block. At the step 319, in response to the host 400 being designated as potentially malicious, designate the teleportation invite as potentially malicious.

On the other hand, referring to FIG. 5, another protocol for assessing 318 whether the virtual universe teleportation invite 314 is potentially malicious relates to the parameter 308 that identifies a virtual universe location as a destination 501 of the invite 314. In this case, the assessment 318 includes assessing 502 whether the destination 501 is potentially malicious. First, obtain, at step 504, a plurality 506 of teleportation acceptance blocks 507 that identify the destination 501; each of the teleportation acceptance blocks defines a virtual universe user as an acceptor 408. Also, obtain for each acceptor 408, at step 510, a plurality 512 of traversal blocks 317 that record virtual universe traversal events by the acceptor 408. Then, at step 514, analyze each plurality 512 of traversal blocks 317 in an effort to identify "continuing" virtual universe traversal events 516 that follow each acceptor's teleportation acceptance block 507. In decision block 519, compare a ratio 517 of continuing virtual universe traversal events 516 to teleportation acceptance blocks 507 with a threshold value 518. Given the teachings herein, the skilled artisan will be able to pick suitable threshold values. In a non-limiting example, a suitable threshold value might be in the range of 0.9 to 1.0. In case (Y branch of decision block 519) the ratio 517 is less than the threshold value 518, at step 520 designate the destination 501 as potentially malicious. Otherwise, (N branch of decision block 519) simply wait for the next assessment that is required, as indicated by the un-numbered "continue" block. At the step 319, in response to the destination 501 being designated as potentially malicious, designate the teleportation invite as potentially malicious.

FIG. 6 depicts another method 600 for assessing whether a destination 501 is potentially malicious. This implementation includes, at step 602, obtaining a plurality 612 of traversal blocks 613 that record outgoing and incoming virtual universe traversal events 614, 616 at the destination 501. In decision block 619, the method 600 compares a ratio 617 of outgoing virtual universe traversal events 614 to incoming virtual universe traversal events 616 at the destination with a threshold value 618. Given the teachings herein, the skilled artisan will be able to pick suitable threshold values. In a non-limiting example, a suitable threshold value might be in the range of 0.9 to 1.0. At step 620, in response to the ratio 617 being less than the threshold value (Y branch of decision block 619), the implementation includes step 620 of designating the destination as potentially malicious. Otherwise, (N branch of decision block 619) simply wait for the next assessment that is required, as indicated by the un-numbered "continue" block.

Thus, according to certain implementations of the method 300, either a destination or a host may be selected as the parameter that marks the teleportation invite and the teleportation acceptance. In either case, the destination or the host can be assessed for whether it is potentially malicious and, if so, then the teleportation invite also will be designated as potentially malicious.

Another aspect of assessing whether a location or host is potentially malicious, is to evaluate a quantity or quality of complaints made against the location or host by other users of the virtual universe. For example, a location or a host with a number of complaints or negative comments in excess of a threshold number can be designated as potentially malicious. In such an implementation, "negative comments" could be identified by natural language processing (e.g., using latent Dirichlet allocation).

Figure 7:
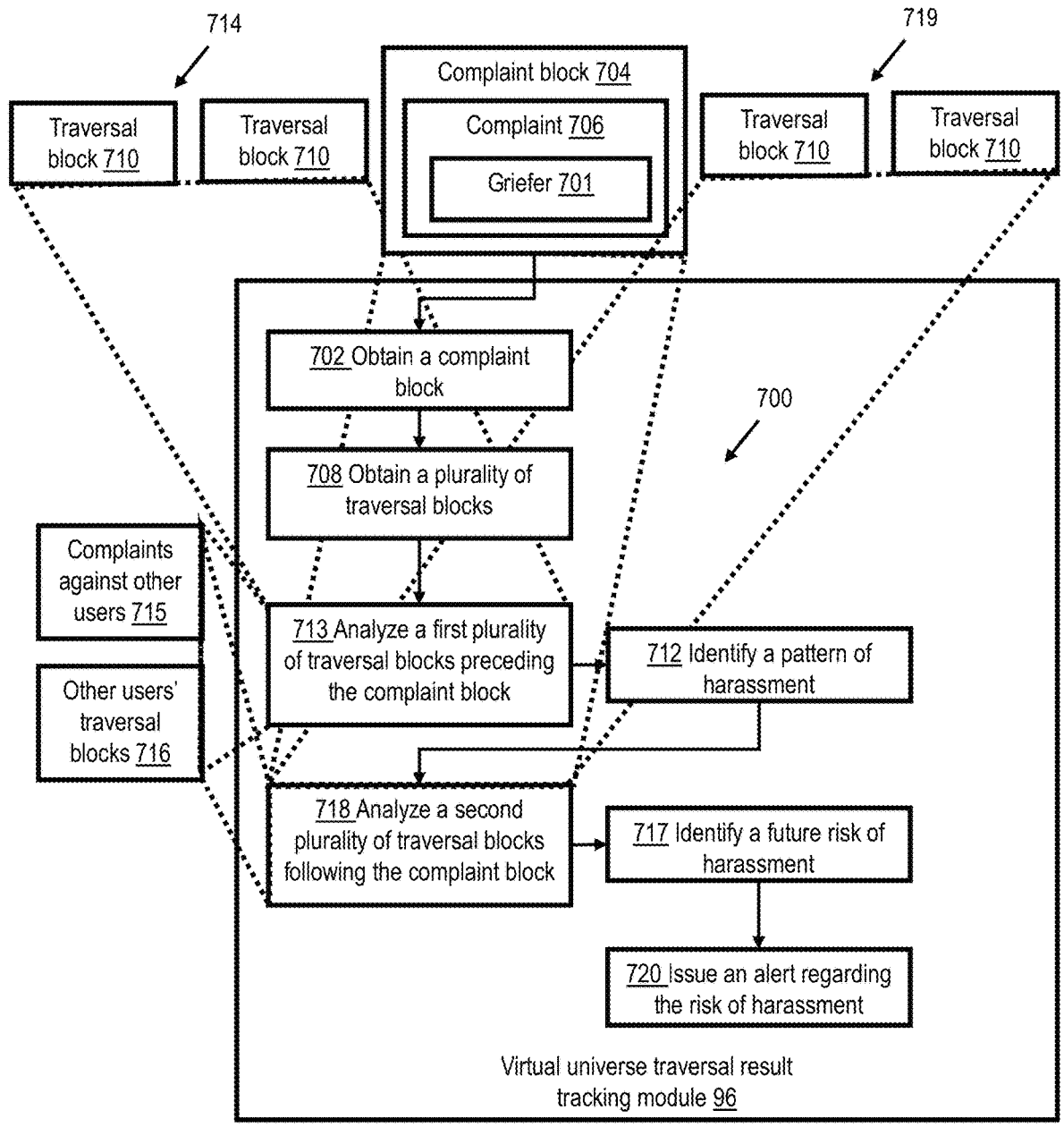
FIG. 7 depicts in flowchart form a method for identifying a risk of harassment in a virtual universe, according to embodiments of the invention.

Referring to FIG. 7, another useful aspect of the invention is depicted. As shown in FIG. 7, the virtual universe traversal result tracking module 96 implements a method 700 for predicting a risk of harassment by a virtual universe user 701 (the "griefer"). The method 700 begins at step 702 of obtaining at least one complaint block 704 that records a complaint 706 made against the griefer 701. The method 700 analyzes the historic movements of the griefer 701 in an effort to identify a pattern of harassment that caused the complaint 706. More particularly, at step 708 obtain a plurality of traversal blocks 710 that record virtual universe traversal events by the griefer 701, then at step 712 identify a pattern of harassment through step 713 of analyzing a first plurality 714 of traversal blocks 710 that precede the complaint block 704. The analysis 713 of the first plurality 714 of traversal blocks 710 can be accomplished by various protocols. One protocol is to reference the griefer's behavior to behaviors of other users that also received similar complaints 715. In other words, the step 713 of analyzing the first plurality 714 of traversal blocks 710 is rule-based, and the rules are derived (e.g., by a cognitive neural network) from a plurality of other complaints 715 against a plurality of other virtual universe users and from a plurality of other users' traversal blocks 716 that record virtual universe traversal events by the plurality of other virtual universe users.

Generally, a cognitive neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A cognitive neural network can implement supervised, unsupervised, or semi-supervised machine learning.

Accordingly, the rules can be derived by machine learning. In certain implementations, supervised learning is used because the plurality of complaints provide clear output signals while the pluralities of traversal blocks provide well-defined input signals. The rules can be used to identify which aspects of the griefer's behavior, i.e. which traversal blocks 710, are most strongly associated with the complaint 706. Various rules and methods may be used to detect griefers, at a certain degree of confidence.

Exemplary rules and methods include a crowdsourcing approach, where players can report griefing. Malicious players then can be labelled, and dealt with later. Griefing in the form of inappropriate avatar-to-avatar aggressive behavior may be detected by using methods to detect pushing, shoving, and related behaviors, perhaps particularly among avatars who have not met in the past. In certain embodiments, inappropriate (e.g. threatening) language is detected responsive to natural language processing methods. In certain embodiments, inappropriate or destructive software can be detected and users or avatars running such software can be flagged.

The traversal blocks 710 may represent all sorts of traversal events involving the griefer 701: not only walking, running, vehicular movement, or teleportation by the griefer, but also and in some implementations more importantly, teleportation invites by the griefer. Thus, for example, the method 700 may include identifying 712 that the griefer received the complaint 706 after inviting a fellow user to teleport to an inescapable location or to a location that will cause the user's avatar to cease functioning.

Some embodiments of the invention are directed to "reforming" a griefer. The preceding steps, alone, could be helpful toward educating the griefer what behavior to avoid. However, some embodiments can use additional techniques besides hindsight.

The method 700 further includes identifying 717 a risk of future harassment by analyzing 718 a second plurality 719 of traversal blocks 710 that follow the complaint block 704. According to certain aspects of the invention, analyzing 717 the second plurality 719 of traversal blocks 710 is rule-based and the rules are derived from the complaint 706, from the first plurality 714 of traversal blocks 710, from a plurality of other complaints 715 against a plurality of other virtual universe users, and from a plurality of other users' traversal blocks 716 that record virtual universe traversal events by the plurality of other virtual universe users. Thus, the past behavior of other users, as well as the griefer's own past behavior, informs the search for potentially problematic current behaviors. This constitutes blockchain reverse correlation ("BCRC").

In case the method 700 does identify 717 a risk of future harassment, the next step is issuing 720 an alert regarding the risk of future harassment. In certain implementations, the alert is issued directly to the griefer 701 in an effort to moderate the griefer's behavior. In other implementations, the alert is issued to another virtual universe user apparently targeted by the griefer 701. For example, the alert may be issued responsive to the griefer teleporting within an interactive distance from another virtual universe user, where "interactive distance" will be defined by the parameters and physics of the virtual universe as a distance within which the griefer can exert an effect (whether physically or by communication) on the other virtual universe user. As another example, the alert may be issued responsive to the griefer inviting the other virtual universe user to teleport, perhaps to a particular location that has previously produced complaints against the griefer or against other users.

Given the discussion thus far, the skilled worker will appreciate that, in general terms, one aspect of the invention provides an exemplary computer-implemented method, which includes obtaining at least one teleportation invite block that records a virtual universe teleportation invite marked by at least one parameter, where the teleportation invite identifies a virtual universe user as an invitee. The exemplary method also includes assessing, responsive to the parameter, whether the virtual universe teleportation invite is potentially malicious, and alerting the invitee in case the virtual universe teleportation invite is potentially malicious.

For example, according to certain implementations of the exemplary method the parameter may identify a virtual universe user as a host of the teleportation invite. In at least some such cases, assessing whether the virtual universe teleportation invite is potentially malicious includes assessing whether the host is potentially malicious. Assessing whether the host is potentially malicious may include obtaining a plurality of teleportation acceptance blocks marked by the at least one parameter that identifies the host; each teleportation acceptance block defines a virtual universe user as an acceptor. Such implementations of the exemplary method then include obtaining for each acceptor a plurality of traversal blocks that record virtual universe traversal events by the acceptor; analyzing the pluralities of traversal blocks corresponding to the plurality of acceptors to identify continuing virtual universe traversal events that follow each acceptor's teleportation acceptance block; and in case a ratio of continuing virtual universe traversal events to teleportation acceptance blocks is less than a threshold value, designating the host as potentially malicious.

According to certain other implementations of the invention, the parameter may identify a virtual universe location as a destination of the teleportation invite. In at least some such cases, assessing whether the virtual universe teleportation invite is potentially malicious includes assessing whether the destination is potentially malicious. Assessing whether the destination is potentially malicious may include obtaining a plurality of teleportation acceptance blocks marked by the parameter; each teleportation acceptance block defines a virtual universe user as an acceptor. Such implementations of the exemplary method then include obtaining for each acceptor a plurality of traversal blocks that record virtual universe traversal events by the acceptor; analyzing the pluralities of traversal blocks corresponding to the plurality of acceptors to identify continuing virtual universe traversal events that follow each acceptor's teleportation acceptance block; and in case a ratio of continuing virtual universe traversal events to teleportation acceptance blocks is less than a threshold value, designating the destination as potentially malicious. On the other hand, assessing whether the destination is potentially malicious may include obtaining a plurality of traversal blocks that record outgoing and incoming virtual universe traversal events at the destination; and in case the destination has a ratio of outgoing virtual universe traversal events to incoming virtual universe traversal events that is less than a threshold value, designating the destination as potentially malicious. For example, the threshold value may be in a range of 0.9 to 1.0.

According to certain implementations of the exemplary computer-implemented method, the teleportation acceptance block may identify a virtual universe user as an acceptor, in which case the method may also include obtaining a plurality of traversal blocks that record virtual universe traversal events by the acceptor; analyzing the plurality of traversal blocks to identify continuing virtual universe traversal events that follow the acceptor's teleportation acceptance block within a defined period of time; and in case no continuing virtual universe traversal events are identified, selecting a destination of the teleportation acceptance as the parameter. Alternatively or additionally, certain implementations may include, in case no continuing virtual universe traversal events are identified, selecting a host of the teleportation acceptance as the parameter.

Other implementations of the exemplary computer-implemented method may include obtaining a plurality of teleportation acceptance blocks marked by the parameter, wherein each teleportation acceptance block defines a virtual universe user as an acceptor, and obtaining for each acceptor a plurality of traversal blocks that record virtual universe traversal events by the acceptor. Such implementations then include analyzing the pluralities of traversal blocks corresponding to the plurality of acceptors to identify continuing virtual universe traversal events that follow each acceptor's teleportation acceptance block; and in case a ratio of continuing virtual universe traversal events to teleportation acceptance blocks is less than a threshold value, alerting the invitee that the virtual universe teleportation invite is potentially malicious.

Another aspect of the invention provides a computer-implemented method that includes obtaining at least one complaint block that records a complaint made against a virtual universe user; obtaining a plurality of traversal blocks that record virtual universe traversal events by the virtual universe user; identifying a pattern of harassment by analyzing a first plurality of traversal blocks that precede the complaint block; identifying a risk of future harassment by analyzing a second plurality of traversal blocks that follow the complaint block; and issuing an alert regarding the risk of future harassment. For example, analyzing the first plurality of traversal blocks may be rule-based with the rules being derived from a plurality of other complaints against a plurality of other virtual universe users and from a plurality of other users' traversal blocks that record virtual universe traversal events by the plurality of other virtual universe users. Additionally, analyzing the second plurality of traversal blocks may be rule-based with the rules being derived from the complaint, from the first plurality of traversal blocks, from a plurality of other complaints against a plurality of other virtual universe users, and from a plurality of other users' traversal blocks that record virtual universe traversal events by the plurality of other virtual universe users.

According to certain implementations of the method, the virtual universe traversal events may include teleportation events. For example, the teleportation events may include teleportation invites issued by the virtual universe user.

According to certain implementations of the method, the alert may be issued to the virtual universe user. For example, the alert may be issued responsive to the virtual universe user teleporting within an interactive distance from another virtual universe user. Alternatively, the alert may be issued to another virtual universe user. For example, the alert may be issued responsive to the virtual universe user inviting the other virtual universe user to teleport.

Certain embodiments of the invention provide an apparatus that includes a memory encoded with computer-executable instructions and a processor operatively coupled in communication with the memory. The processor is configured by the computer-executable instructions to facilitate any of the methods above discussed.

Thus, techniques of the present invention can provide substantial beneficial technical effects. For example, one or more embodiments provide one or more of:

A permanent and unbreakable link between a user and the user's traversal events. That link—the distributed and tamperproof record of traversal—can be verified and tracked.

A user can share the user's traversal record with friends, family or fans securely. Transferring traversals is made as easy as transferring or copying a traversal record. Consider that traversal data is added to the block in the form of: userid, source location, destination location, method of travel, etc. for each time a user teleports from one location to another location or moves by a certain amount in a VU. This information may be added to the growing blockchain for a user. In one embodiment, a user may transfer (that is, "share") this information with other users (which is akin to sharing a travel tour or special travel itinerary in a virtual world or game) with others. For example, a user's traversal pattern may be shared as a special URL via e-mail or social media.

Reliably tracing where and how a user's traversals spread in the VU or 3D game. Embodiments of the invention can show all the locations a user's avatar has appeared and its movements over time.

A built-in certificate of authenticity ("COA"), a unique cryptographic ID associated with the complete segment history. The COA can be verified anytime and printed out.

Unique, limited editions of traversal webs, which may be informative but also attractive to look at. Digital editions make it possible to own and transfer the permissions for digital traversals. Thus, embodiments of the invention enable users to transfer, consign, or loan their traversal paths and diagrams without losing attribution. Any transaction generated by a user is cryptographically signed by the user using a private key (i.e. via a transaction generator module). The other nodes can validate that the transaction is signed by the user, by reference to the signer public key. Transactions can be validated through the replicated execution of the smart contract (i.e. chaincode) and given the fault assumption underlying consensus algorithm (e.g. BFT in hyperledger blockchain fabric, which implements that among the n validating peers at most f<n/3 may "lie" and behave arbitrarily, but all others execute the chaincode correctly.) The confirmation of the transaction validation entails ownership, and then writes the transaction (and ownership info) on the ledger. The particular choice of public key cryptography implementation depends on the design of the blockchain.

Enhanced detection of malicious teleportation invite to un-escapable location within a virtual universe through rating analysis of the teleportation location, a historical teleportation analysis of the possessor/host (griefer analysis), etc. responsive to data from a single "point of truth."

Enhanced alert system for outputting a set of possibly malicious teleportation location invites.

Enhanced augmented functionality of the VU traversal via the use of Blockchain Reverse Correlation (BRC) that makes use of the griefer behavior report by another user of the VU to trigger the accessing of the blockchain in order to perform statistics on the blocks preceding the report by some number of steps and/or a specified amount of time.

Improved tracking of VU traversal by permanently storing and managing events related to teleportation of items on blockchain: the send id, receiver id, an item or avatar token (the fingerprint of the item or avatar using which historical details of the item or avatar can be retrieved), metadata information (e.g. timestamp, location, path taken, etc.), distance traveled, VU or 3D context/environment information, etc.

Figure 8:
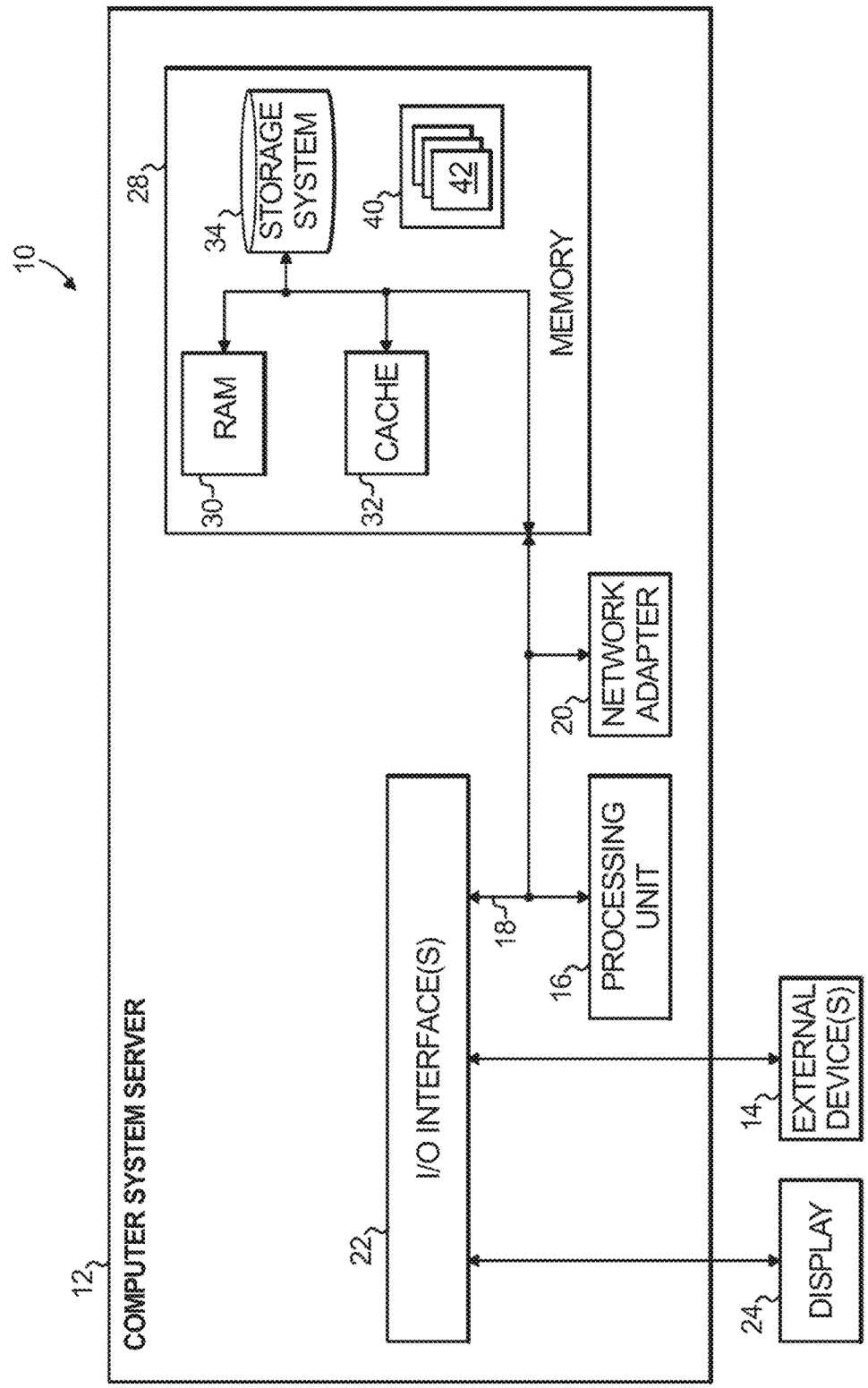
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining at least one complaint block that records a complaint made against a first virtual universe user;
   obtaining a first plurality of traversal blocks that precede the complaint block and record virtual universe traversal events by the first virtual universe user and a second plurality of traversal blocks that record virtual universe traversal events by a second virtual universe user, wherein each traversal block is a data element of a blockchain and records at least one of walking, running, vehicular access, flying, or teleportation;
   identifying a pattern of negative behavior towards the second virtual universe user by analyzing the first and second pluralities of traversal blocks;
   identifying a risk of future negative behavior by the first virtual universe user towards one or more other virtual universe users by analyzing a third plurality of traversal blocks that follow the complaint block; and
   issuing an alert regarding the risk of the future negative behavior towards the one or more other virtual universe users.

2. The method of claim 1, wherein analyzing the first plurality of traversal blocks is rule-based and the rules are derived from a plurality of other complaints against a plurality of other virtual universe users and from a plurality of other users' traversal blocks that record virtual universe traversal events by the plurality of other virtual universe users.

3. The method of claim 1, wherein the virtual universe traversal events comprise teleportation events.

4. The method of claim 3, wherein the teleportation events comprise teleportation invites issued by the first virtual universe user.

5. The method of claim 2, wherein the alert is issued to the first virtual universe user.

6. The method of claim 5, wherein the alert is issued responsive to the first virtual universe user teleporting within an interactive distance from another virtual universe user.

7. The method of claim 1, wherein the alert is issued to another virtual universe user.

8. The method of claim 7, wherein the alert is issued responsive to the first virtual universe user inviting another virtual universe user to teleport.

9. An apparatus comprising:
   a memory; and at least one processor, coupled to said memory, and operative to:

obtain at least one complaint block that records a complaint made against a first virtual universe user;

obtain a first plurality of traversal blocks that precede the complaint block and record virtual universe traversal events by the first virtual universe user and a second plurality of traversal blocks that record virtual universe traversal events by a second virtual universe user, wherein each traversal block is a data element of a blockchain and records at least one of walking, running, vehicular access, flying, or teleportation;

identify a pattern of negative behavior towards the second virtual universe user by analyzing the first and second pluralities of traversal blocks;

identify a risk of future negative behavior by the first virtual universe user towards one or more other virtual universe users by analyzing a third plurality of traversal blocks that follow the complaint block; and issue an alert regarding the risk of the future negative behavior towards the one or more other virtual universe users.

10. The apparatus of claim 9, wherein analyzing the first plurality of traversal blocks is rule-based and the rules are derived from a plurality of other complaints against a plurality of other virtual universe users and from a plurality of other users' traversal blocks that record virtual universe traversal events by the plurality of other virtual universe users.

11. The apparatus of claim 9, wherein the virtual universe traversal events comprise teleportation events.

12. The apparatus of claim 11, wherein the teleportation events comprise teleportation invites issued by the first virtual universe user.

13. The apparatus of claim 10, wherein the alert is issued to the first virtual universe user.

14. The apparatus of claim 13, wherein the alert is issued responsive to the first virtual universe user teleporting within an interactive distance from another virtual universe user.

15. The apparatus of claim 9, wherein the alert is issued to another virtual universe user.

16. The apparatus of claim 15, wherein the alert is issued responsive to the first virtual universe user inviting another virtual universe user to teleport.

17. A non-transitory computer readable medium comprising computer executable instructions which when executed by a computer cause the computer to perform a method of:

obtaining at least one complaint block that records a complaint made against a first virtual universe user;

obtaining a first plurality of traversal blocks that precede the complaint block and record virtual universe traversal events by the first virtual universe user and a second plurality of traversal blocks that record virtual universe traversal events by a second virtual universe user, wherein each traversal block is a data element of a blockchain and records at least one of walking, running, vehicular access, flying, or teleportation;

identifying a pattern of negative behavior towards other virtual universe user by analyzing the first and second pluralities of traversal blocks;

identifying a risk of future negative behavior towards one or more other virtual universe users by analyzing a third plurality of traversal blocks that follow the complaint block; and issuing an alert regarding the risk of the future negative behavior towards the one or more other virtual universe users.

18. The non-transitory computer readable medium of claim 17, wherein analyzing the first plurality of traversal blocks is rule-based and the rules are derived from a plurality of other complaints against a plurality of other virtual universe users and from a plurality of other users' traversal blocks that record virtual universe traversal events by the plurality of other virtual universe users.

19. The non-transitory computer readable medium of claim 17, wherein the virtual universe traversal events comprise teleportation events.

20. The non-transitory computer readable medium of claim 19, wherein the teleportation events comprise teleportation invites issued by the first virtual universe user.

* * * * *